US012525754B2

(12) United States Patent
Hsiao et al.

(10) Patent No.: US 12,525,754 B2
(45) Date of Patent: Jan. 13, 2026

(54) ELECTRICAL CONNECTOR WITH A GROUNDING PLATE MODULE FOR A HIGHER SIGNAL TRANSMISSION

(71) Applicants: FOXCONN (KUNSHAN) COMPUTER CONNECTOR CO., LTD., Kunshan (CN); FOXCONN INTERCONNECT TECHNOLOGY LIMITED, Grand Cayman (KY)

(72) Inventors: Shih-Wei Hsiao, New Taipei (TW); Genn-Sheng Lee, New Taipei (TW); Hung-Cheng Liao, New Taipei (TW); Tsu-Yang Wu, New Taipei (TW)

(73) Assignees: FOXCONN (KUNSHAN) COMPUTER CONNECTOR CO., LTD., Kunshan (CN); FOXCONN INTERCONNECT TECHNOLOGY LIMITED, Grand Cayman (KY)

( * ) Notice: Subject to any disclaimer, the term of this patent is extended or adjusted under 35 U.S.C. 154(b) by 313 days.

(21) Appl. No.: 18/210,314

(22) Filed: Jun. 15, 2023

(65) Prior Publication Data

US 2023/0411912 A1 Dec. 21, 2023

(30) Foreign Application Priority Data

Jun. 16, 2022 (CN) ......................... 202221516154.2

(51) Int. Cl.

*H01R 13/6597* (2011.01)
*H01R 13/6461* (2011.01)
*H01R 12/72* (2011.01)

(52) U.S. Cl.

CPC ..... *H01R 13/6597* (2013.01); *H01R 13/6461* (2013.01); *H01R 12/724* (2013.01); *H01R 12/727* (2013.01)

(58) Field of Classification Search

CPC ............ H01R 13/6597; H01R 13/6471; H01R 13/6461

USPC ........................................ 439/607.34, 607.28

See application file for complete search history.

(56) References Cited

U.S. PATENT DOCUMENTS 7,371,117 B2 5/2008 Gailus
9,490,585 B2 * 11/2016 Yang .................. H01R 13/6585
9,531,129 B2 12/2016 De Boer
9,531,130 B1 12/2016 Phillips et al.
9,768,557 B2 9/2017 Phillips et al.
10,243,304 B2 3/2019 Kirk et al.
10,283,910 B1 * 5/2019 Chen ........................ H01R 4/04
10,644,455 B1 5/2020 Champion (Continued)

FOREIGN PATENT DOCUMENTS

CN 210576568 U 5/2020
CN 216289110 U 4/2022
TW 202133508 A 9/2021

*Primary Examiner* — Hae Moon Hyeon

(74) *Attorney, Agent, or Firm* — Ming Chieh Chang

(57) ABSTRACT

An electrical connector includes: a longitudinal insulating housing; plural differential-pair signal terminals and plural grounding terminals arranged in a longitudinal direction of the insulating housing; and a grounding plate module retained in the insulating housing, wherein the grounding plate module has an electromagnetic interference (EMI) absorber and a grounding plate retained in the EMI absorber, and the grounding plate defines plural grounding fingers extending out of the EMI absorber to contact with corresponding grounding terminals.

11 Claims, 13 Drawing Sheets

(56) References Cited

U.S. PATENT DOCUMENTS

| | | | | |
|---|---|---|---|---|
| 11,283,221 | B2 | 3/2022 | Hsueh et al. | |
| 11,381,039 | B2 | 7/2022 | Hsiao et al. | |
| 11,581,684 | B2 | 2/2023 | Wang et al. | |
| 2010/0035478 | A1* | 2/2010 | Yang | H01R 12/714 439/638 |
| 2012/0282808 | A1* | 11/2012 | Luo | H01R 13/6471 439/628 |
| 2014/0004744 | A1* | 1/2014 | Hsu | H01R 13/658 439/626 |
| 2020/0067221 | A1* | 2/2020 | Wang | H01R 13/502 |
| 2020/0194914 | A1* | 6/2020 | Hsiao | H01R 13/6473 |
| 2020/0212612 | A1* | 7/2020 | Yang | H01R 12/775 |
| 2021/0044060 | A1* | 2/2021 | Wu | H01R 12/725 |

* cited by examiner

ELECTRICAL CONNECTOR WITH A GROUNDING PLATE MODULE FOR A HIGHER SIGNAL TRANSMISSION

BACKGROUND OF THE INVENTION

Field of the Invention

The present invention relates generally to an electrical connector, and particularly to an electrical connector for a higher signal transmission.

Description of Related Arts

U.S. Pat. No. 9,490,585 discloses an electrical connector for high speed transmission, which includes an insulative housing, a plurality of conductive terminals retained in the insulative housing, a first grounding bar and a second grounding bar. Conductive terminals include a plurality of differential signal terminal pairs and grounding terminals, the first grounding bar is electrically connected to contacting portions of the grounding terminals, and the second grounding bar defines a plurality of abutting portions abutting against retaining portions of the grounding terminals. The first grounding bar and the second grounding bar are connected by a bridging portion to reduce signal crosstalk and improve the high-frequency performance of the electrical connector, but with the increasing requirement for transmission rate of high frequency connectors, the grounding bar in the prior art can no longer meet its high frequency performance.

SUMMARY OF THE INVENTION

An object of the present invention is to provide an electrical connector with an improved high frequency performance.

To achieve the above-mentioned object, an electrical connector comprises: a longitudinal insulating housing; a plurality of terminals disposed in the insulating housing and comprising a plurality of differential-pair signal terminals and a plurality of grounding terminals arranged in a longitudinal direction of the insulating housing; and a grounding plate module retained in the insulating housing, wherein the grounding plate module comprises an electromagnetic interference (EMI) absorber and a grounding plate retained in the EMI absorber, and the grounding plate defines a plurality of grounding fingers extending out of the EMI absorber to contact with corresponding grounding terminals of the plurality of the terminals.

Other advantages and novel features of the invention will become more apparent from the following detailed description of the present embodiment when taken in conjunction with the accompanying drawings.

DETAILED DESCRIPTION OF THE PREFERRED EMBODIMENT

Figure 1:
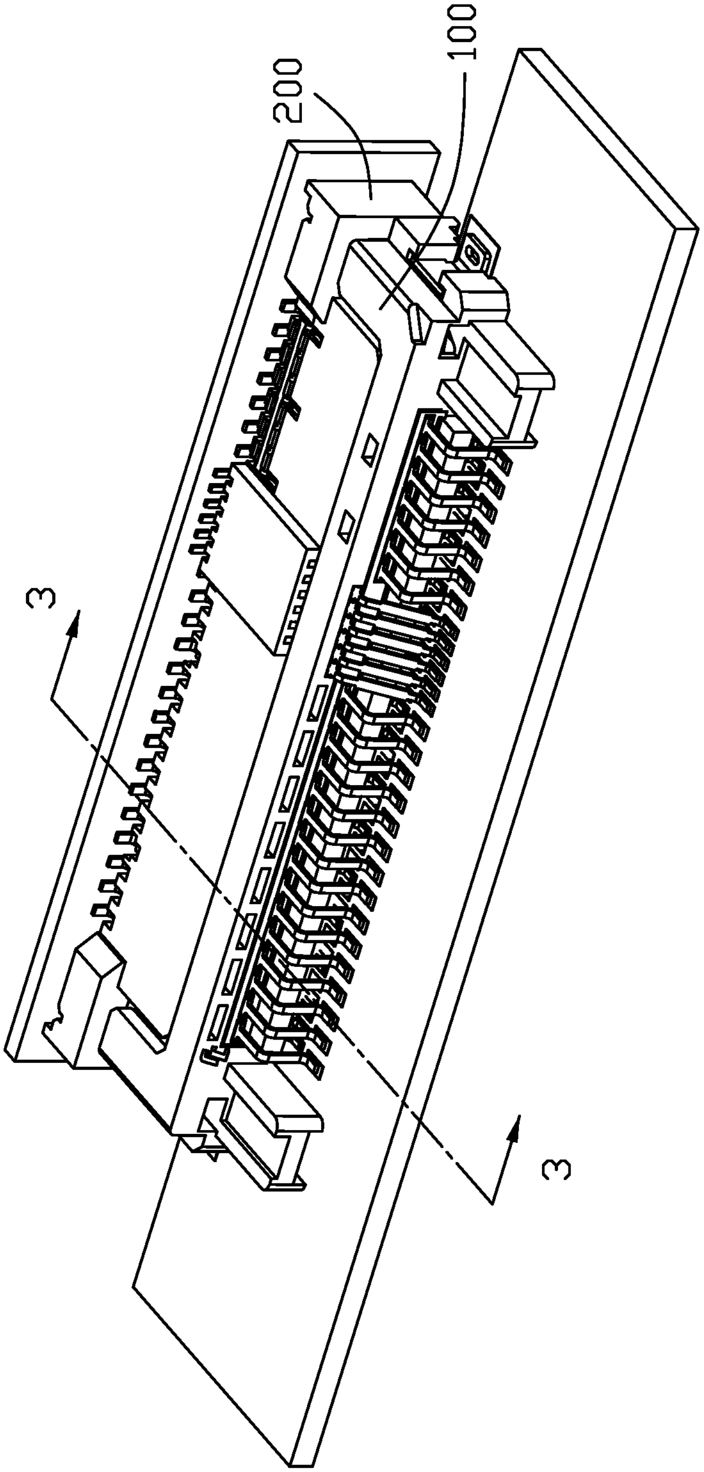
FIG. 1 is a perspective view of a receptacle connector and a plug connector mounted on printed circuit boards and mated with each other according to an embodiment of the present invention.

Reference will now be made to the drawing figures to describe the preferred embodiment of the present invention in detail.

Figure 2:
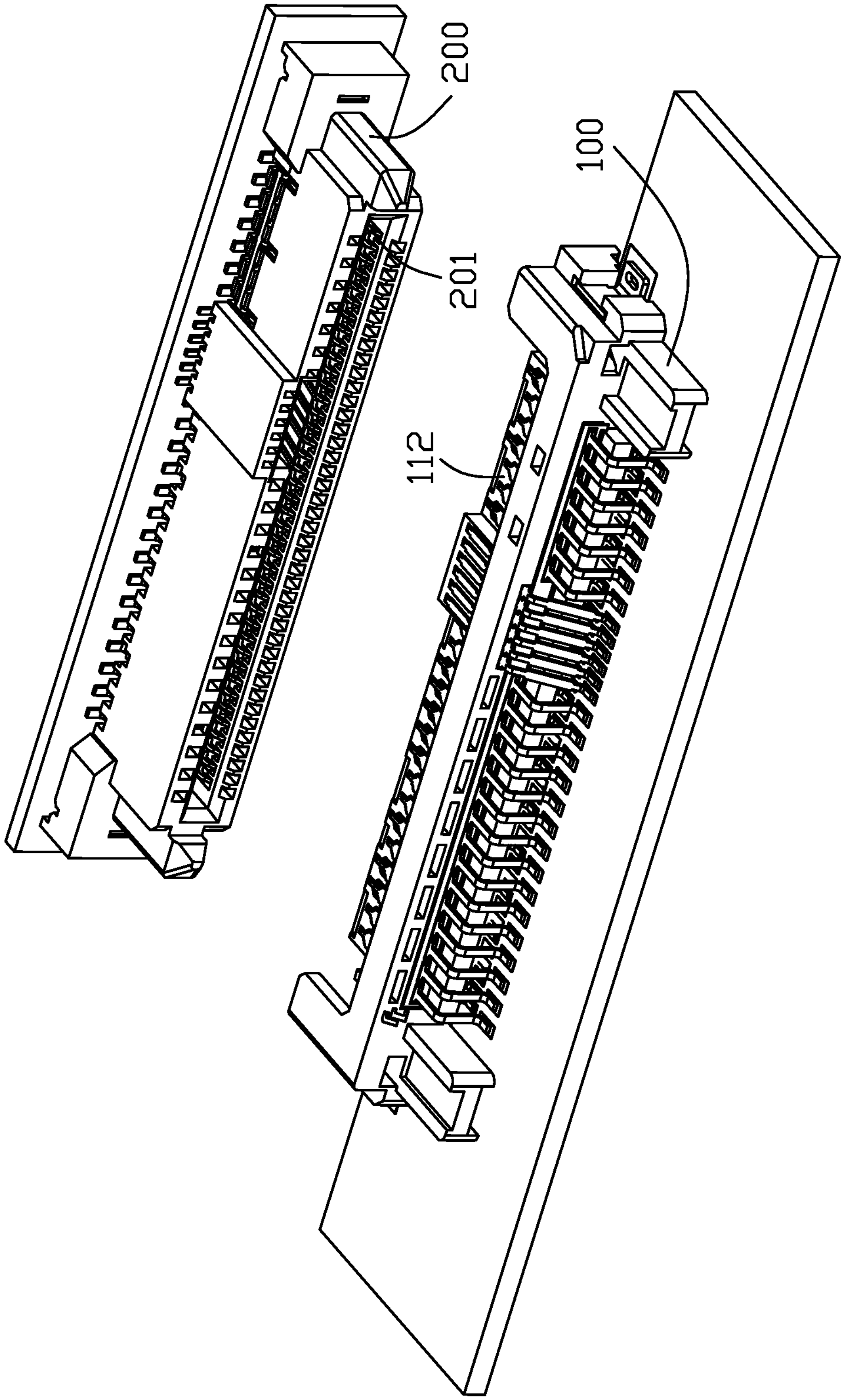
FIG. 2 is a perspective view of the receptacle connector and the plug connector disconnecting from each other in FIG. 1.
Figure 3:
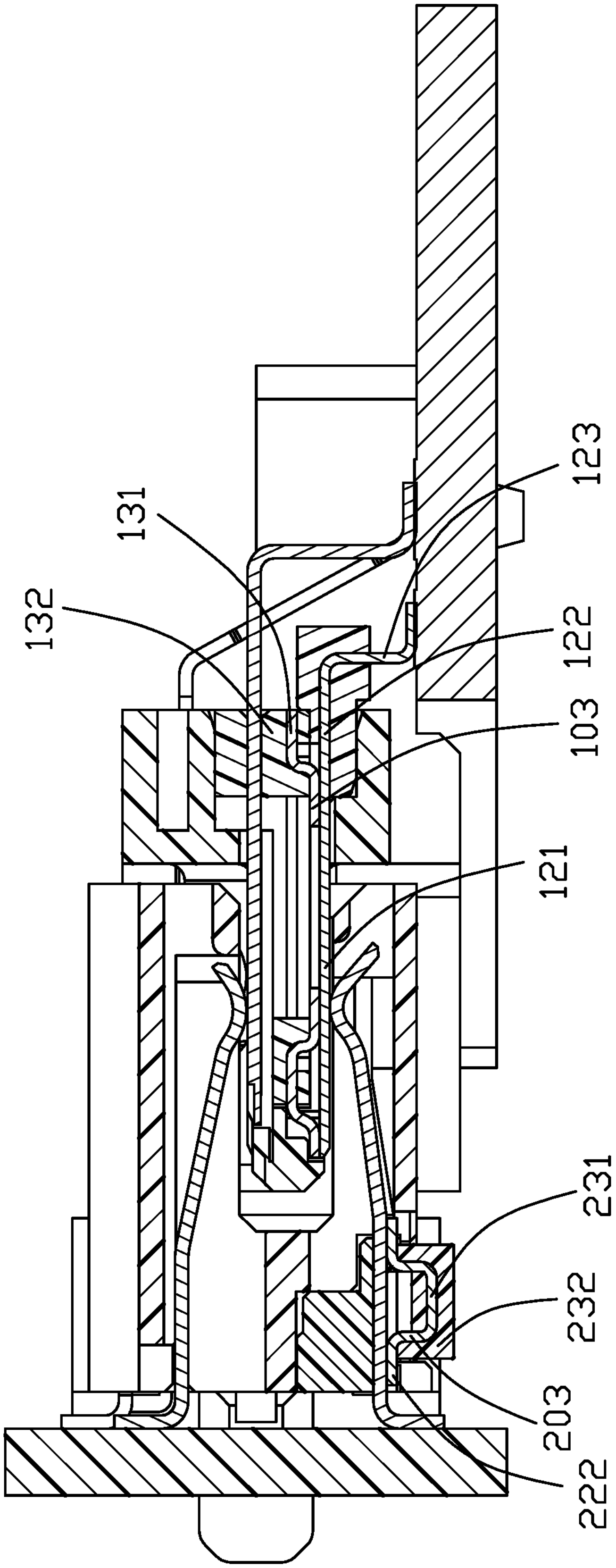
FIG. 3 is a cross-sectional view of the receptacle connector and the plug connector taken along a broken line 3-3 in FIG. 1.
Figure 4:
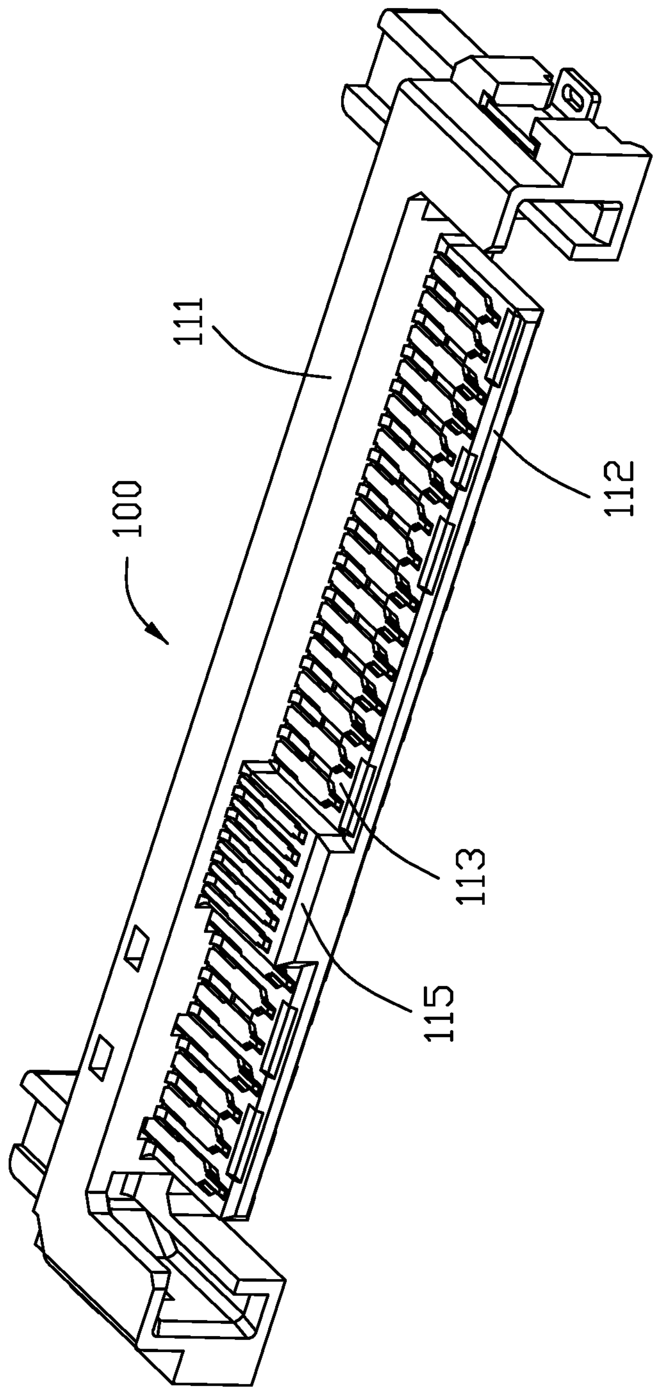
FIG. 4 is a front perspective view of the plug connector in FIG. 1.
Figure 5:
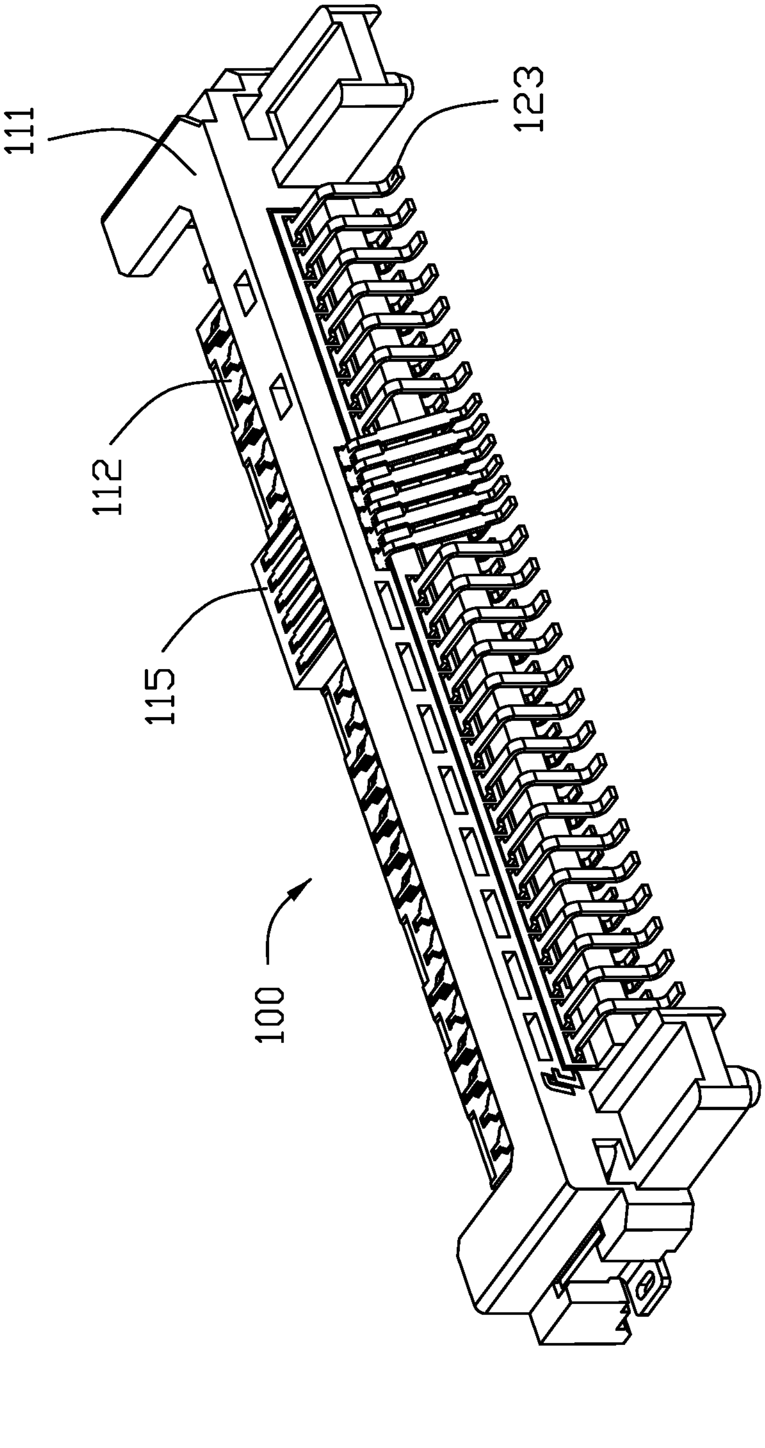
FIG. 5 is a rear perspective view of the plug connector in FIG. 4.
Figure 6:
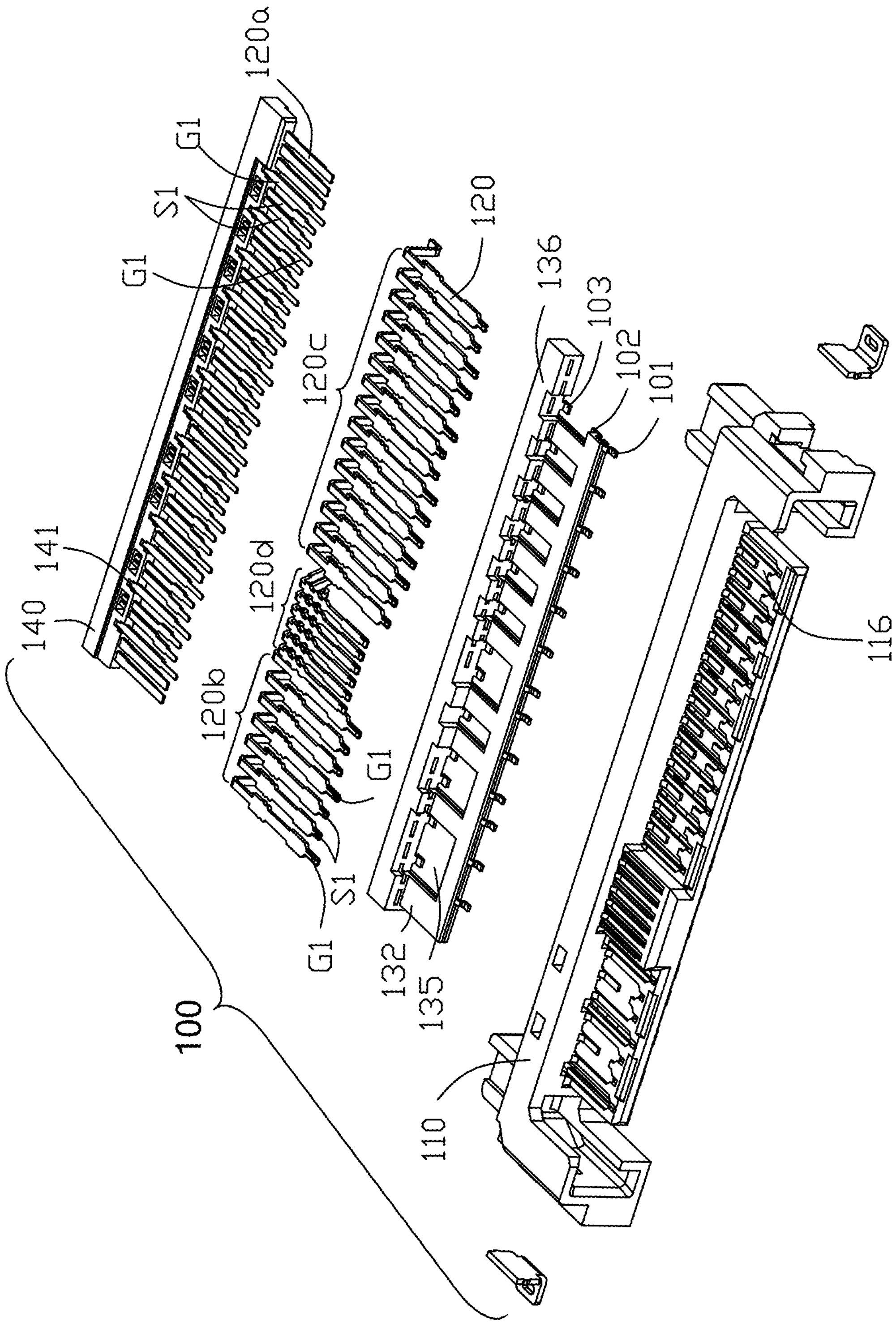
FIG. 6 is an exploded perspective view of the plug connector of FIG. 4.

Referring to FIGS. 1-3, an electrical connector of the present invention can be a plug connector or a receptacle connector. In this embodiment, an electrical connector assembly is illustrated, including and a receptacle and a plug connector, the receptacle connector 200 is mated with the plug connector 100 to transmit high-frequency signals. For the convenience of description, a front end is defined on an end of electrical connector confronting with a complementary connector, and the receptacle connector 200 and the plug connector 100 are mated with each other in a front-back direction in this embodiment. In the plug connector 100, a mating tongue 112 projects forwards. In the receptacle connector 200, the mating slot 201 opens forward.

Referring to FIGS. 4-8, the plug connector 100 includes a longitudinal insulating housing 110 made from insulating material, a plurality of plug terminals 120 disposed in the plug insulating housing 110, a grounding plate module 130. The plurality of terminals 120 in this embodiment, includes four rows, three rows labeled with 120*b*, 120*c*, 120*d* are inserted into the insulating housing 110, the other one row labeled with 120*a* is retained by insulting bar 140 and then inserted into the insulating housing 110, the row 120*a* include a plurality of differential-pair signal terminals S1 and a plurality of grounding terminals G1. The grounding plate module 130 includes an EMI (Electromagnetic Interference) absorber 132 and a metallic grounding plate 131 retained in the EMI absorber 132. The grounding plate 131 defines a plurality of grounding fingers 101, 102, 103 corresponding to the grounding terminals G1. The grounding plate module 130 is disposed on the insulating housing 110. The EMI absorber 132 encases the grounding plate 131. The grounding fingers extend out of the EMI absorber 132 to contact with the grounding terminals G1. The EMI absorber 132 is a magnetic loss material, which can absorb energy and reduce signal crosstalk by encasing the grounding plate 131. In this embodiment, the EMI absorber 132 is molded at an outside of the grounding plate 131 by an injection molding process. The grounding plate module 130 is then fixed to the insulating housing 110 by assembling. In other embodiments, the grounding plate module 130 can be fixed to the insulating housing 110 by an injection molding process.

Referring to FIGS. 4-8, the insulating housing 110 comprises a base 111 and a mating tongue 112 extending forwardly from the base 111 in the front-back direction. The mating tongue 112 forms opposite upper face 113 and lower face 114. A raised portion 115 is formed on the upper face 113. A plurality of passageways 116 are formed in the upper face 113, the lower face 114 and the raised portion 115. Each of the plug terminals 120 is accommodated in the passageways 116 and includes a contacting portion 121 exposed upon the mating tongue 112, a leg portion 123 exposed to an outside of the insulating housing 110 and a retaining portion 122. The retaining portion 122 is held at the base 111. A narrowed section 124 is formed at a front end of the contacting portion 121. The width of the narrowed section 124 along longitudinal direction is smaller than the width of the contacting section 121. When the plug connector 100 is mated with the receptacle connector 200, the narrowed section 124 of the grounding terminals G1 can contact the terminals of the receptacle connector 200 preferentially. The grounding fingers comprise a plurality of first grounding fingers 101, second grounding fingers 102 and third grounding fingers 103. Each of the grounding terminals G1 is in contact with the first grounding finger 101, the second grounding finger 102 and the third grounding finger 103 respectively at different positions. The main purpose is to eliminate the potential difference between different parts of the grounding terminal G1 as much as possible, so that the different parts of the grounding terminal G1 can get same ground potentials as much as possible. It can improve signal crosstalk and move the resonance point of crosstalk to high frequency, thereby improving the performance of high frequency transmission. The grounding plate module 130 is arranged in the mating tongue 112 by inserting. The first grounding fingers 101 are in contact with the narrowed sections 124. The second grounding fingers 102 are in contact with the contacting portions 121. The third grounding fingers 103 are in contact with the retaining portions 122. The grounding plate 131 corresponds to the three different positions of the grounding terminal G1 by the first grounding finger 101, the second grounding finger 102 and the third grounding finger 103, so as to realize continuous impedance of the plug terminal 120 and avoid abrupt impedance changes.

Figure 8:
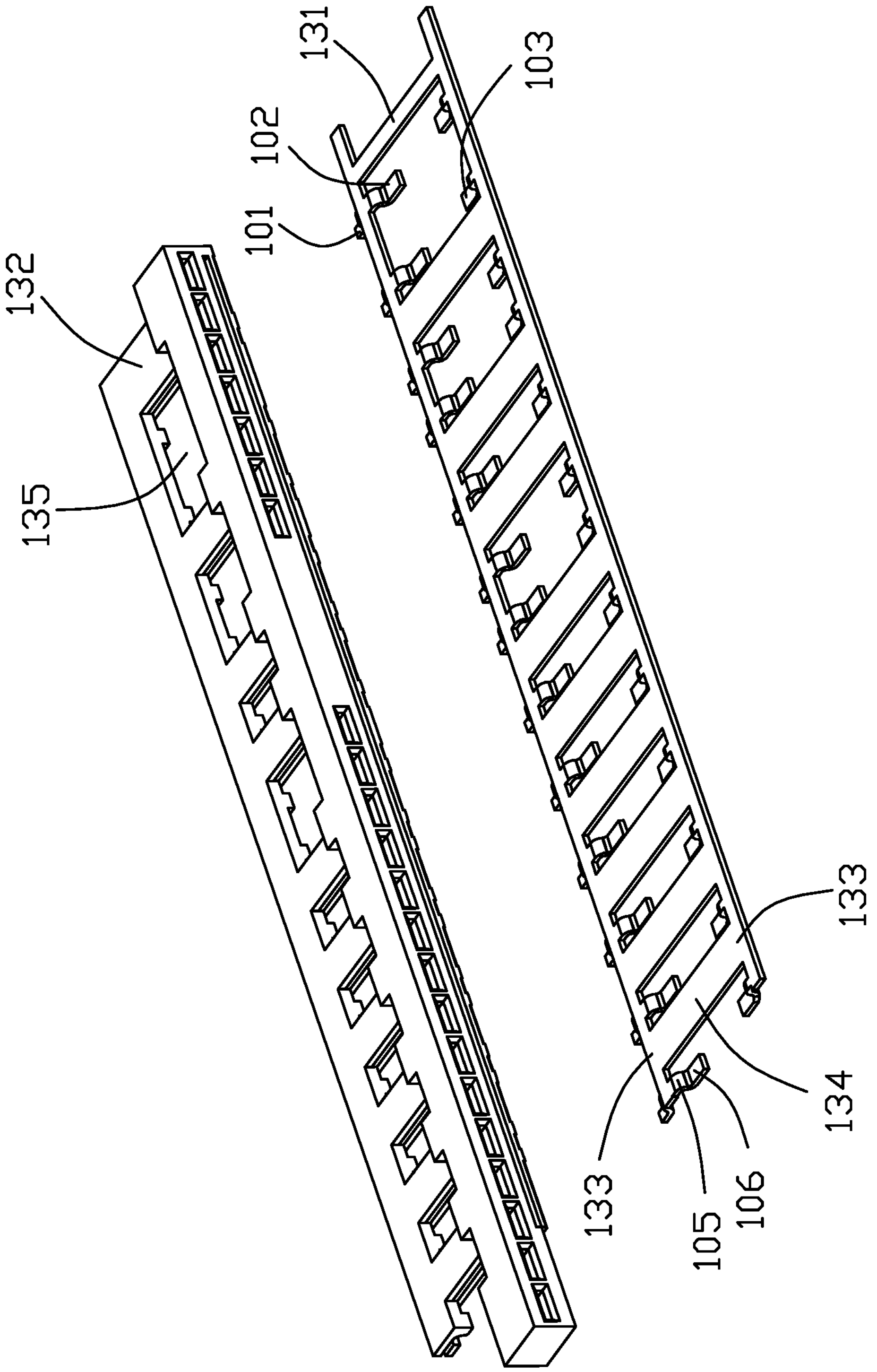
FIG. 8 is an exploded perspective view of the grounding plate module of FIG. 6.
Figure 9:
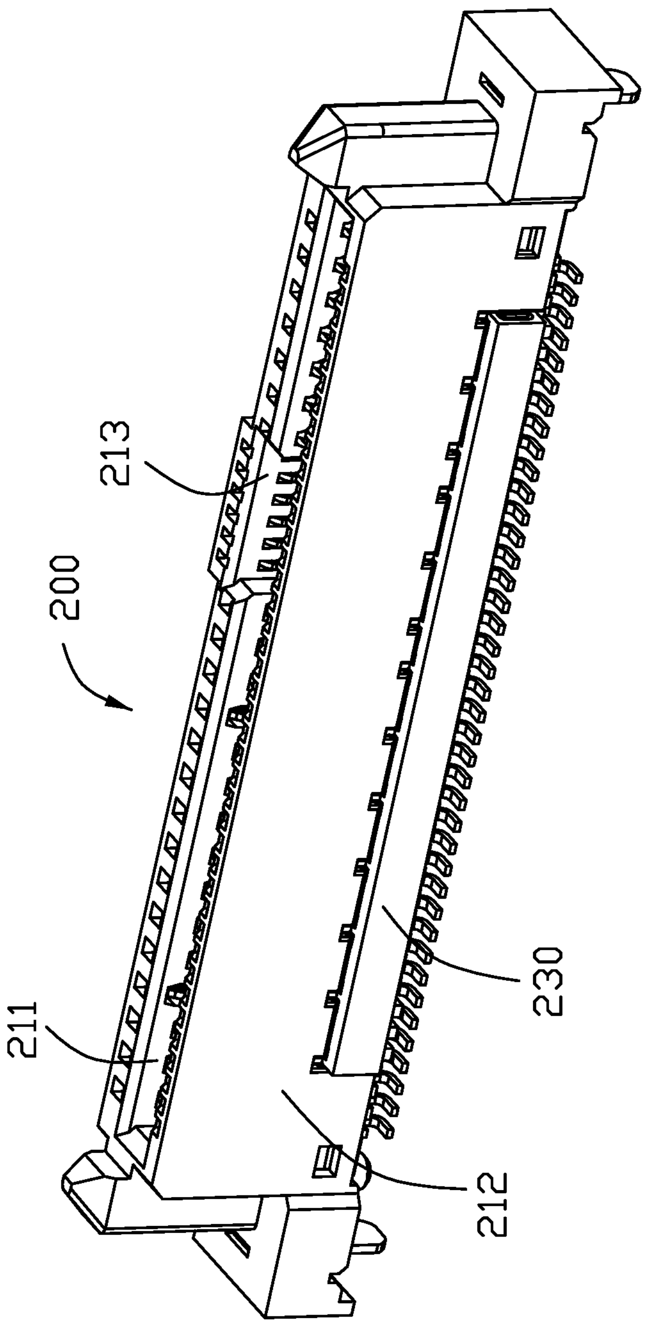
FIG. 9 is a top perspective view of the receptacle connector in FIG. 1.
Figure 10:
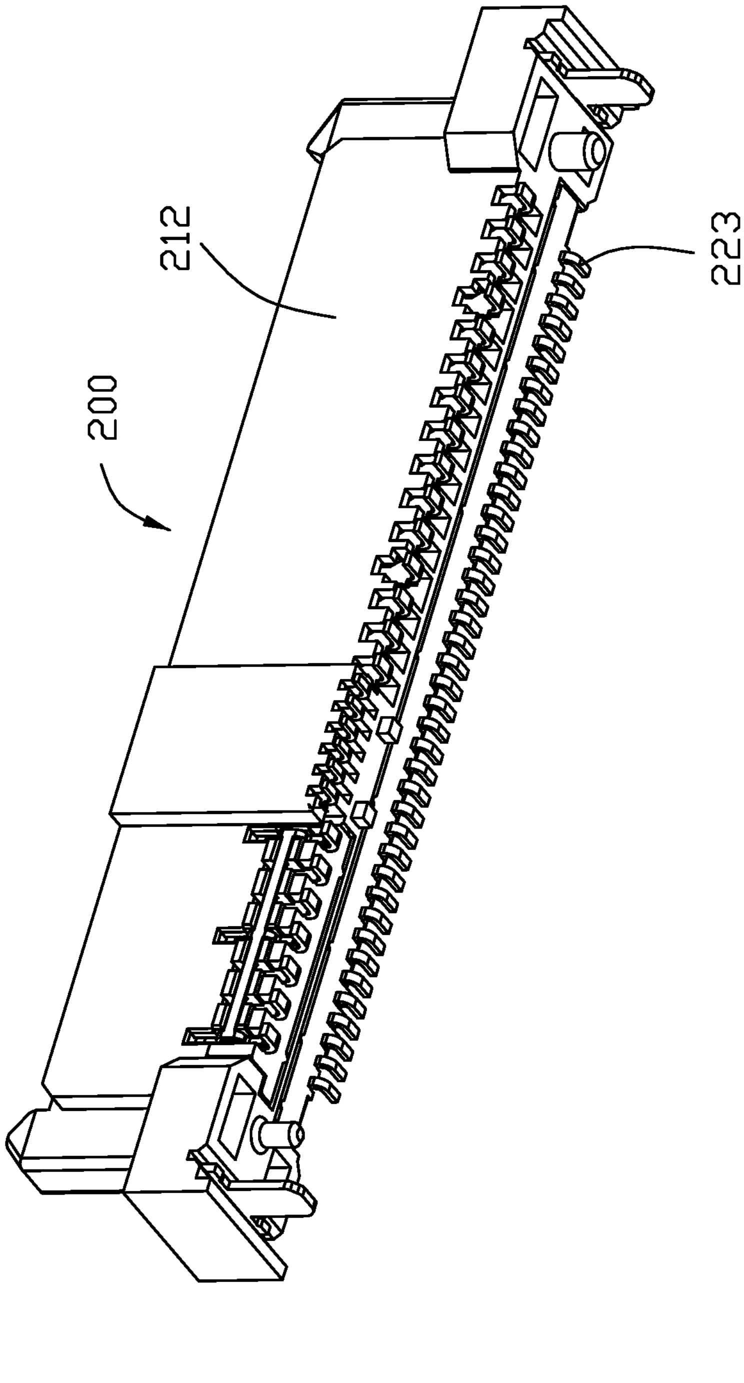
FIG. 10 is a bottom perspective view of the receptacle connector in FIG. 9.

Referring to FIG. 8, the grounding plate 131 defines two main bars 133 and a plurality of bridging portions 134 connecting the two main bars 133. The two main bars are arranged parallel to each other in the front-back direction. The bridging portions 134 extend along the front-back direction and are arranged corresponding to the differential-pair signal terminals S1. The main bars 133 and the bridging portions 134 is embedded in the EMI absorber 132 and the grounding fingers are exposed upon a plurality of hollow portions 135 defines on the EMI absorber 132. The grounding finger comprises a bending portion 105 bending and extending from a side edge of the main bar 133 and a connecting portion 106 extending from the bending portion 105 in the front-back direction. The connecting portions 106 are in contact with the grounding terminals G1. The plurality of the first grounding fingers 101 and the plurality of the second grounding fingers 102 are arranged in one-to-one correspondence and extend from both sides of one main bar 133 in opposite directions. The plurality of the third grounding fingers 103 extend from the other main bar 133 in one-to-one correspondence with the plurality of the second grounding fingers 102. In the front-back direction, the second grounding fingers 102 are located between the first grounding fingers 101 and third grounding fingers 103. The first grounding fingers 101 are in contact with the front ends of the grounding terminals G1. The first grounding fingers 101, the second grounding fingers 102 and the third grounding fingers 103 connected to the same grounding terminal G1 extend on the same straight line along the front-back direction. In the front-back direction, the distance between first grounding finger 101 and the second grounding finger 102 is smaller than the distance between the corresponding second grounding finger 102 and third grounding finger 103. By connecting the first grounding finger 101, the second grounding finger 102 and the third grounding finger 103 to different parts of the corresponding grounding terminal G1 as dispersedly as possible, the better effect of improving the high-frequency performance can be achieved.

Figure 7:
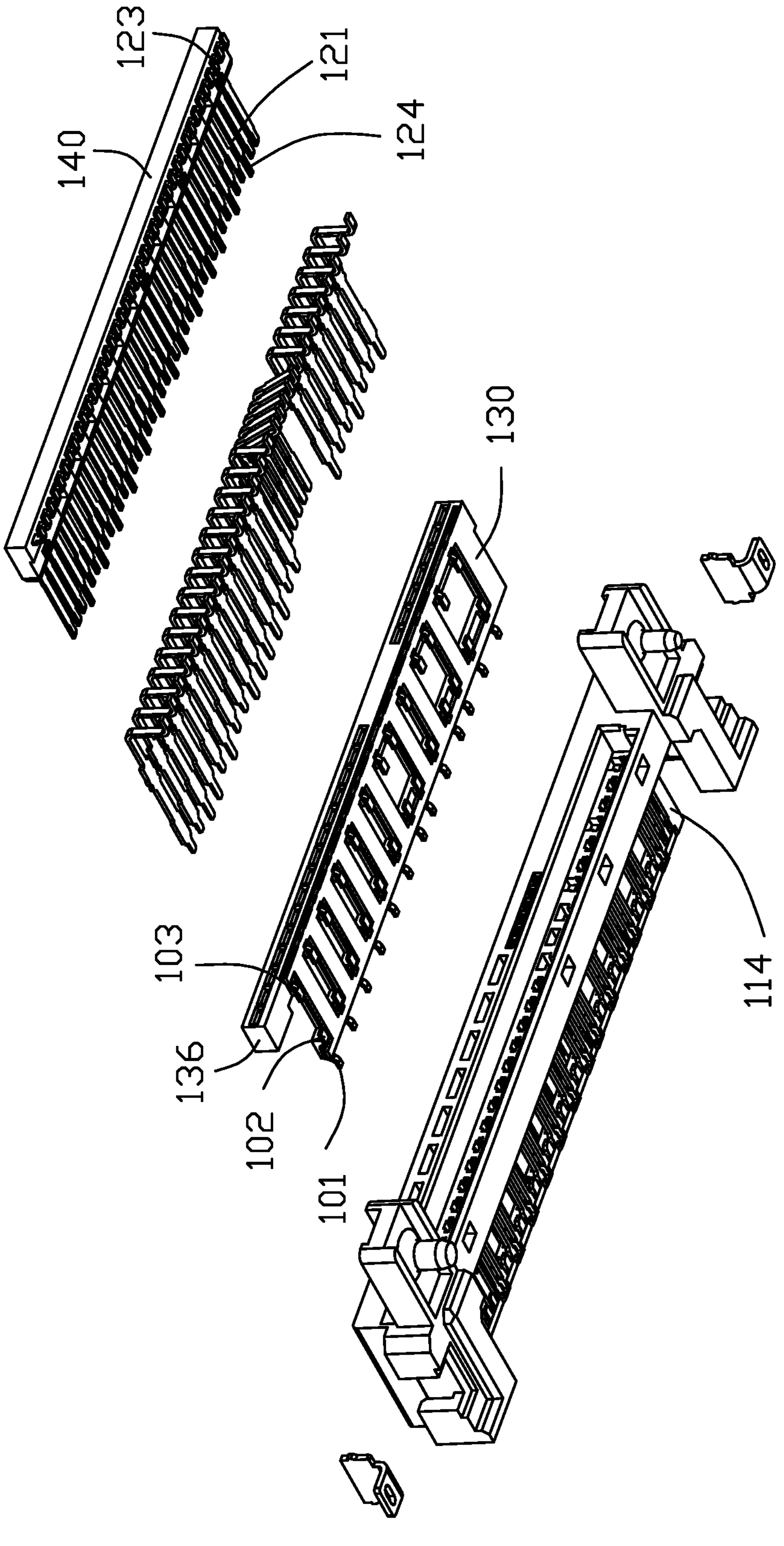
FIG. 7 is another perspective view of the plug connector of FIG. 6.

Referring to FIGS. 7-8, the plurality of plug terminals 120 includes a row of first terminals **120*a* exposed upon the lower face 114, and a row of second terminals 120*b*, a row of third terminals 120*c* and a row of fourth terminals 120*d* exposed upon the upper face 113. The row of fourth terminals 120*d* are located on the raised portion 115 and the row of second terminals 120*b* and the row of second terminals 120*c* are respectively located by two sides of the raised portion 115. The row of first terminals 120*a* or the row of second terminals 120*b* include a plurality of differential-pair signal terminals S1 and a plurality of grounding terminals G1 alternately arranged with each other in the longitudinal direction. The row of third terminals 120*c* and the row of fourth terminals 120*d* include power terminals (not labeled). In this embodiment, the first grounding fingers 101, the second grounding fingers 102 and the third grounding fingers 103 extend downwards and resist the grounding terminals G1 in the row of first terminals 120*a*. The row of first terminals 120*a* is integrally formed, via an insert-molding process, within the insulating bar 140. The insulating bar 140 with the row of first terminals 120*a* is assembled in the insulating housing 110 from a back end. The insulating bar 140 forms a plurality of recesses 141 to receive the corresponding third grounding fingers 103 so as to increase the distance between the contact area of the second grounding finger 102 and that of the third grounding finger 103 for better electrical performance. The EMI absorber 132 includes a fixing block 136 arranged behind the hollow portions 135. The row of second terminals 120*b* and the row of third terminals 120*c* are embedded and molded on the fixing block 136. The signal crosstalk between plug terminals 120** can be improved.

Referring to FIGS. 9-13, the receptacle connector 200 comprises a an insulating housing 210 extending in the longitudinal direction, a plurality of receptacle terminals 220 disposed in the insulating housing 210, a grounding plate module 230. The plurality of receptacle terminals includes four rows, two rows labeled with **220*a*, 220*b* are retained with the first insulating bar 240 and the second insulating bar 250 respectively, firstly, and then are assembled to the insulating housing 210. Each of the two rows of terminals 220 comprise a plurality of differential-pair signal terminals S2 and a plurality of grounding terminals G2. The grounding plate module 230 comprises a metallic grounding plate 231 and an EMI absorber 232. The grounding plate 231 defining a plurality of grounding fingers corresponding to the grounding terminals G2. Similar to the structure of the plug connector 100, the grounding plate module 230 is disposed on the insulating housing 210. The EMI absorber 232 encases the grounding plate 231. The grounding fingers extend out of the EMI absorber 232 to contact with the grounding terminals G2. The EMI absorber 232 is made from magnetic loss material, which can absorb energy and reduce signal crosstalk by encasing the grounding plate 231. In this embodiment, the EMI absorber 232 is made by an injection molded process at an outside of the grounding plate 231. The grounding plate module 230 is fixed to the insulating housing 210 by assembling. In other embodiments, the grounding plate module 230 can be fixed to the insulating housing 210** by an injection molding process.

Referring to FIGS. 9-13, the insulating housing 210 comprises a mating slot 211 extending in the longitudinal direction and two side walls 212 located on both sides of the mating slot 211. The mating slot 211 is used for an insertion with the mating tongue 112 of the plug connector 100. A first side wall 212 of the insulating housing 210 defines a concave portion 213 correspondingly receiving the raised portion 115. The receptacle terminals 220 are fixed on the side walls 212. Each of the receptacle terminals 220 comprises an elastic contacting portion 221 extending into the mating slot 211, a leg portion 223 extending outside the insulating housing 210, and a middle portion 222 connecting the leg portion 223 and the contacting portion 221. A second side wall 212 defines a longitudinal groove 214 in the longitudinal direction. The grounding plate module 230 is located in the longitudinal groove 214. The grounding fingers comprise a plurality of first grounding fingers 201 and second grounding fingers 202. Each of the grounding terminals G2 is both in contact with the first grounding finger 201 and the second grounding finger 202 respectively at different positions. The main purpose is to eliminate the potential difference between different parts of the grounding terminal G2 as much as possible, so that the different parts of the grounding terminal G2 can get the same ground potential as much as possible. It can improve signal crosstalk and move the resonance point of crosstalk to high frequency, thereby improving the performance of high frequency transmission.

Figure 13:
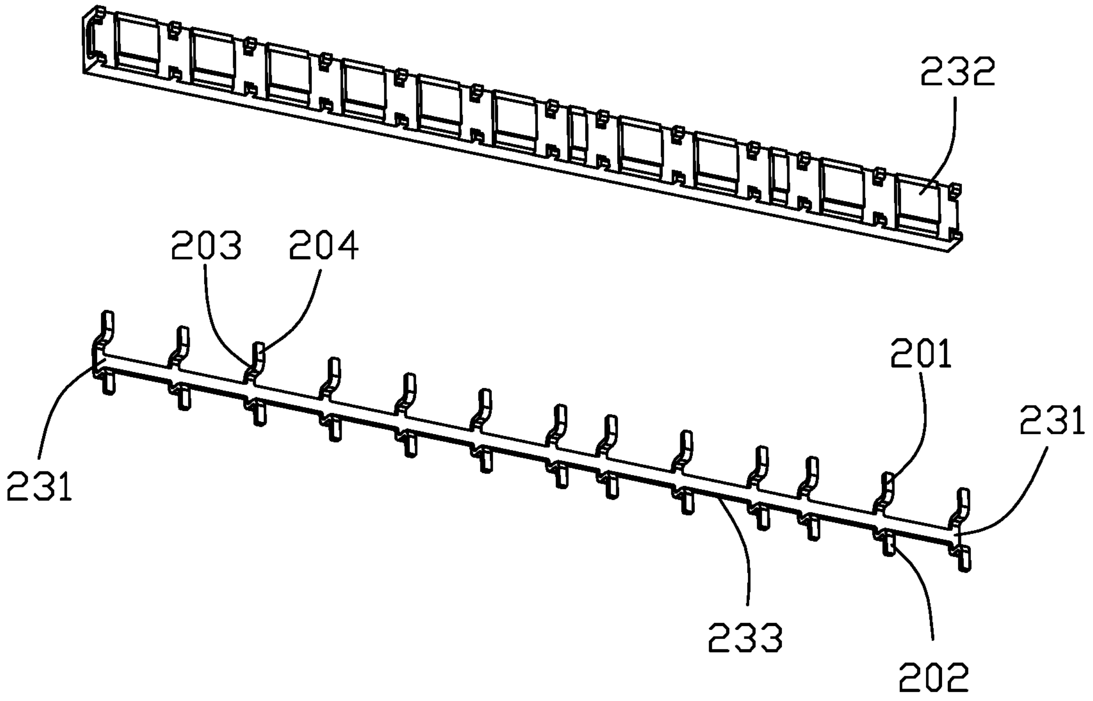
FIG. 13 is an exploded perspective view of the grounding plate module of FIG. 12.

Referring to FIG. 13, the grounding plate 231 comprises a main bar 233 extending in the longitudinal direction, first grounding fingers 201 and the second grounding fingers 202 extend from opposite sides of the main bar 233 in opposite directions and aligned with each other in the front-back direction. The grounding finger comprises a bending portion 203 bending and extending from a side edge of the main bar 233 and a connecting portion 204 bending in reverse from the bending portion 203. The connecting portions 204 are in contact with the grounding terminals G2. The EMI absorber 232 encases the main bar 233 and the bending portions 203. The connecting portions 204 extend out of the EMI absorber 232. The connecting portions 204 of the first grounding fingers 201 and the second grounding fingers 202 are in contact with the middle portion 222 of the receptacle terminals 220, so as to improve the high-frequency performance.

Figure 11:
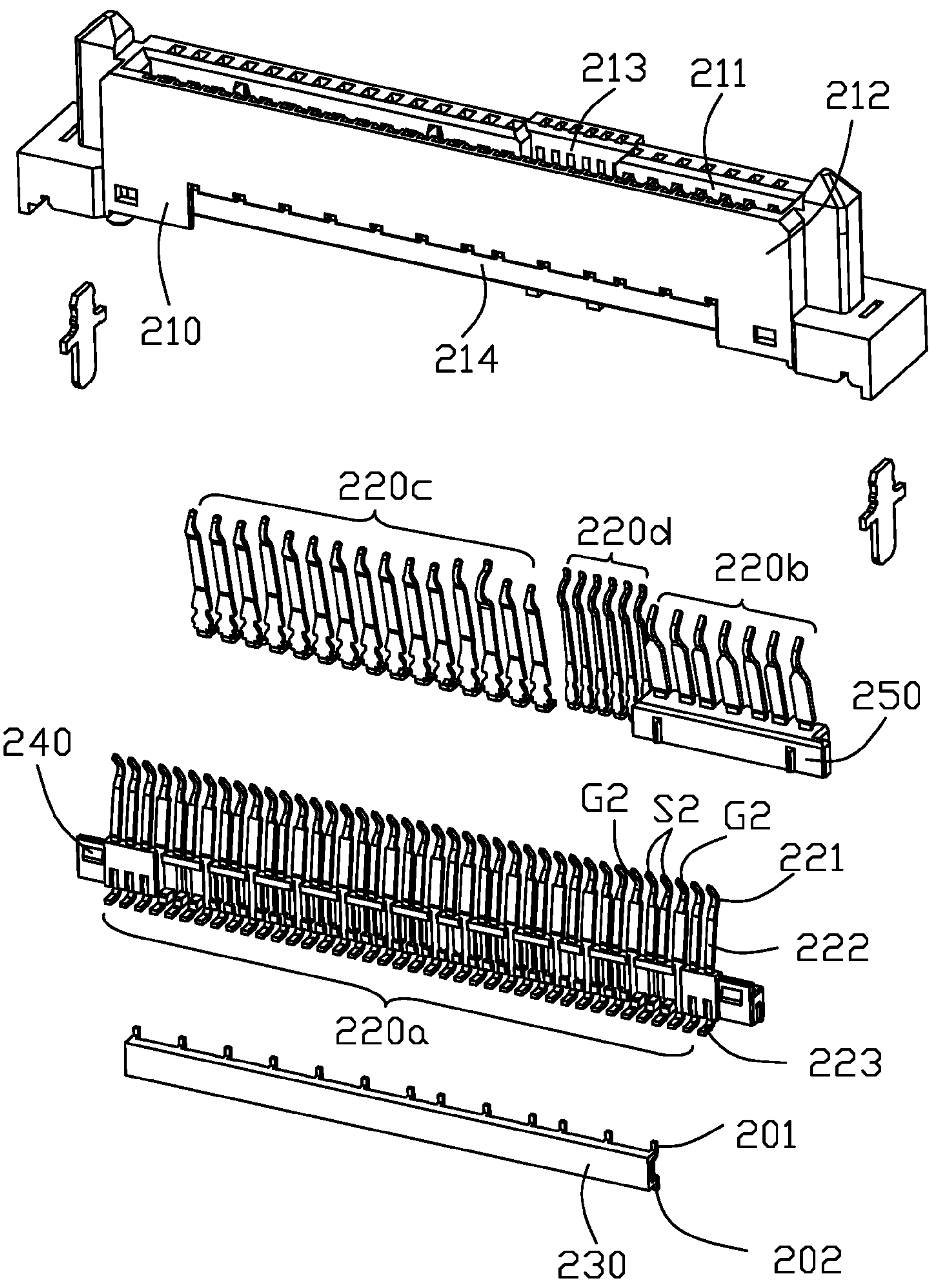
FIG. 11 is an exploded perspective view of the receptacle connector in FIG. 9.
Figure 12:
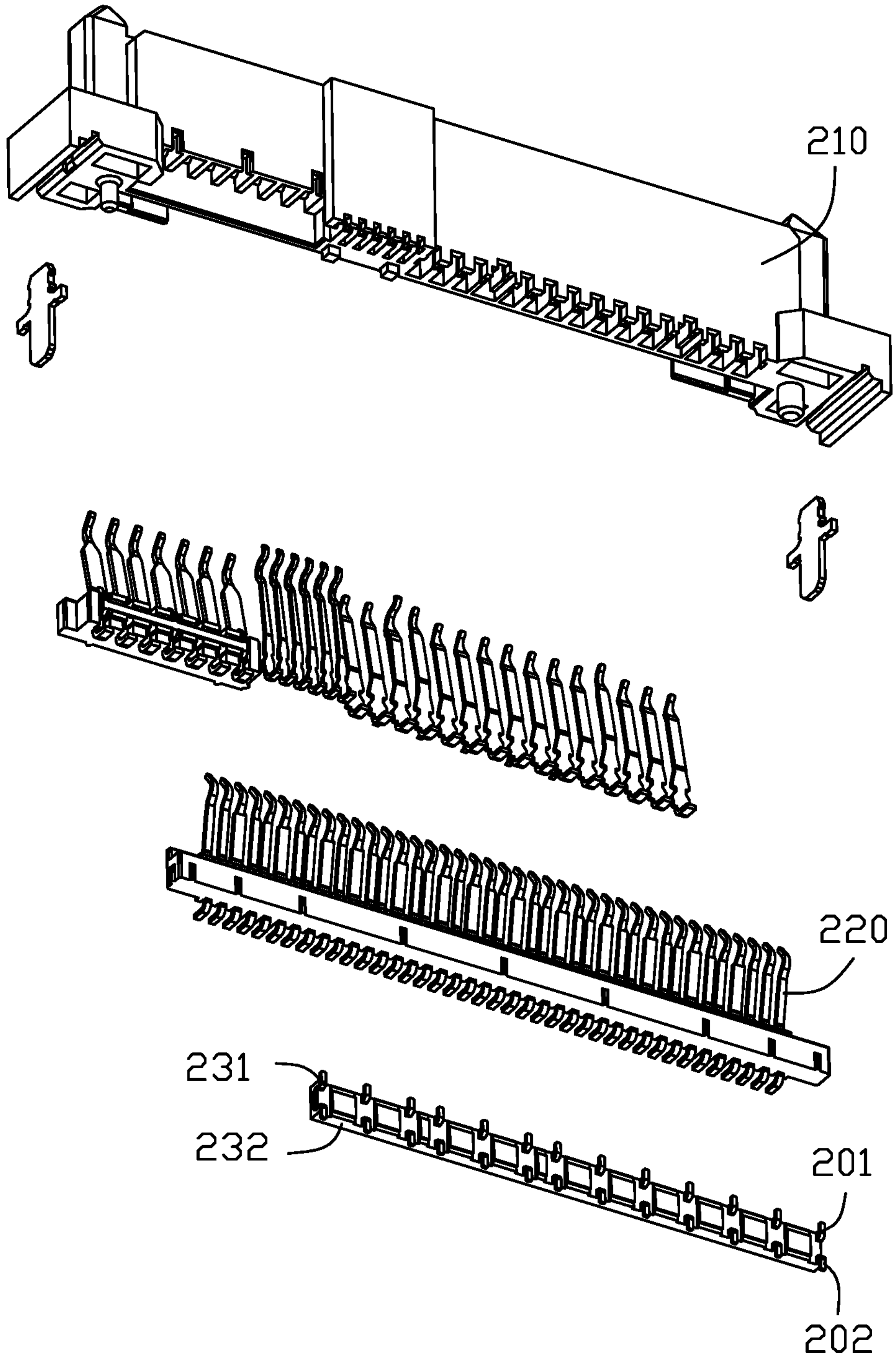
FIG. 12 is another perspective view of the receptacle connector in FIG. 11.

Referring to FIGS. 11-12, the receptacle terminal 220 includes a row of first terminals 220*a* arranged in a row below the mating slot 211, a row of second terminals 220*b* arranged in a row and above the mating slot 211 and on the right side of the recess 213, A row of third terminal 220*c* disposed above the slot 211 and on the left side of the recessed portion 213 and a row of fourth terminals 220*d* disposed in the recessed portion 213. The row of second terminals 220*b*, the row of third terminals 220*c*, and the row of fourth terminals 220*d* commonly arranged in a row and above the mating slot 211 wherein, the row of fourth terminals 220*d* are located on the recess 213, and the row of second terminals 220*b* and the row of third terminals 220*c* are respectively located by two sides of the recess 213. The row of first terminals 220*a* of the receptacle terminals 220 is correspondingly mated with the row of first terminals 120*a* of the plug terminals 120. The row of fifth terminals 220*b* is correspondingly mated with the row of second terminals 120*b*. The row of first terminals 220*a* and the row of second terminals 220*b* both include a plurality of differential-pair signal terminals S2 and a plurality of grounding terminals G2 alternately arranged with each other in the longitudinal direction. The row of first terminals 220*a* are embedded in the first insulating bar 240. The middle portions 222 are exposed on a surface of the first insulating bar 240 and are connected to the first grounding fingers 201 and the second grounding fingers 202. The row of second terminal 220*b* are embedded in the second insulating bar 250 and assembled to the insulating housing 210.

The above-mentioned embodiments are only preferred embodiments of the present invention, and should not limit the scope of the present invention, any simple equivalent changes and modifications made according to the claims of the present invention and the contents of the description should still belong to the present invention.

The invention claimed is:

1. An electrical connector comprising:
- a longitudinal insulating housing;
- a plurality of terminals disposed in the insulating housing and comprising a plurality of differential-pair signal terminals and a plurality of grounding terminals arranged in a longitudinal direction of the insulating housing; and
- a grounding plate module retained in the insulating housing;
- wherein the grounding plate module comprises an electromagnetic interference (EMI) absorber and a grounding plate retained in the EMI absorber, and the grounding plate defines a plurality of grounding fingers extending out of the EMI absorber to contact with corresponding grounding terminals of the plurality of terminals.

2. The electrical connector as claimed in claim 1, wherein the EMI absorber surrounds an outside of the grounding plate by an injection molding process, and the grounding plate module is fixed within the insulating housing by assembling or another injection molding process.

3. The electrical connector as claimed in claim 2, wherein the grounding plate comprises a main bar, each of the grounding fingers having a bending portion extending from a longitudinal edge of the main bar and offset from the main bar, and a connecting portion extending from the bending portion in a front-back direction perpendicular to the longitudinal direction, and the connecting portions are in contact with the corresponding grounding terminals.

4. The electrical connector as claimed in claim 2, wherein the grounding plate comprises a main bar, the grounding fingers comprise a plurality of first grounding fingers extending forwards from the main bar and a plurality of second grounding fingers extending rearwards from the main bar, and each of the grounding terminals is in contact with one of the first grounding fingers and one of the second grounding fingers at different positions.

5. The electrical connector as claimed in claim 4, wherein the insulating housing comprises a mating slot opening forward and two opposite side walls along the longitudinal direction, each of the plurality of terminals comprises an elastic contacting portion extending forward into the mating slot, a leg portion extending out of the insulating housing, and a middle portion connecting the leg portion and the contacting portion, the side wall defines a longitudinal groove at an outside thereof in the longitudinal direction, the grounding plate module is located in the longitudinal groove, and the first and the second grounding fingers are in contact with the middle portions of the grounding terminals.

6. The electrical connector as claimed in claim 4, wherein the grounding plate further comprises another main bar, the grounding fingers comprise a plurality of third grounding fingers extending forward from the another main bar, and each of the grounding terminals is in contact with the first grounding finger, the second grounding finger, and the third grounding finger at different positions.

7. The electrical connector as claimed in claim 6, wherein the plurality of first grounding fingers and the plurality of second grounding fingers extend from opposite longitudinal edges of the main bar.

8. The electrical connector as claimed in claim 7, wherein the insulating housing comprises a base and a mating tongue extending forwardly from the base in a front-back direction perpendicular to the longitudinal direction, each of the plurality of terminals comprises a contacting portion exposed upon the mating tongue, a leg portion exposed outside of the insulating housing, and a retaining portion therebetween, the retaining portions are retained in the base, the grounding plate module is retained in the mating tongue, the first and the second grounding fingers are in contact with the contacting portions of the plurality of grounding terminals, and the third grounding fingers are in contact with the retaining portions of the plurality of grounding terminals.

9. The electrical connector as claimed in claim 7, wherein the grounding plate has a plurality of bridging portions connecting the two main bars, the EMI absorber encases the main bars and the bridging portions to leave a plurality of hollow portions, and the first, the second, and the third grounding fingers are exposed to the hollow portions.

10. The electrical connector as claimed in claim 9, wherein the first grounding fingers and the second grounding fingers and the third grounding fingers are aligned with each other in the front-rear direction.

11. The electrical connector as claimed in claim 1, further comprising another plurality of terminals secured to the EMI absorber.

* * * * *